United States Patent Office 3,458,595
Patented July 29, 1969

---

3,458,595
EPOXIDIZED AMIDE-IMIDE POLYMERIC COATING POWDER
William W. Ulmer, Muskegon, Mich., assignor to Anaconda Wire and Cable Company, New York, N.Y., a corporation of Delaware
No Drawing. Filed Jan. 4, 1967, Ser. No. 607,161
Int. Cl. C08g 45/12
U.S. Cl. 260—830    9 Claims

ABSTRACT OF THE DISCLOSURE

An amide-imide polymeric powder suitable for coating magnet wires by electrostatic process is prepared by preparing a solid solution of an amide-imide polymer in an organic anhydride. The solid solution is ground to fine particle size and then is mixed with an epoxy resin. The epoxy resin is cured onto the fine particles by reacting with the organic anhydride.

BACKGROUND OF THE INVENTION

Field of the invention

This invention relates to a new coating powder particularly suitable for the manufacturing of magnet wire by the electrostatic coating method and to the method for preparing said powder. The invention also relates to a new magnet wire using the powder as insulation.

Description of the prior art

Amide-imide polymer has been used successfully as insulation for electrical conductors, particularly for magnet wires. Heretofore, the magnet wire has been prepared by coating an enamel containing the amide-imide polymer and then baking it at a high temperature to vaporize the solvent and to cure the polymer on the conductor. The amide-imide polymer, however, cannot be used in a solvent-free coating process such as an electrostatic coating process, because of the polymer which does not melt readily.

SUMMARY OF THE INVENTION

I have now found that the amide-imide polymer can be modified to form a coating powder which can be used advantageously in the electrostatic coating process for the praparation of magnet wires. Broadly stated, the modification method of this invention comprises the preparation of a solid solution of an amide-imide polymer in an organic anhydride. The solid solution is then ground to a finely divided form and is mixed with an epoxy resin to cause the curing of the epoxy resin by the organic anhydride onto the solid solution.

The resultant powder is an amide-imide polymer having a coating of an organic anhydride cured epoxy resin. The powder may be applied by an electrostatic fluid powder gun or in an electrostatic bed on an electrical conductor to form the desired magnet wire.

DESCRIPTION OF THE PREFERRED EMBODIMENTS

The amide-imide polymers that are suitable for the present invention include the polymers containing both amide and imide linkages in a repeating unit of

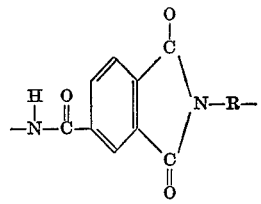

wherein R is a residue of an organic diamine.

The polyamide-imide may be prepared by copolymerization of an acyl halide derivative of trimellitic anhydride (1, 2, 4-benzene tri-carboxylic acid anhydride) and an aromatic primary diamine. The polymeric products may have the following structure:

(A)

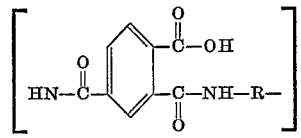

and (B)

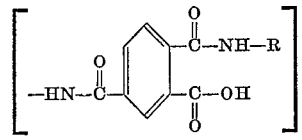

wherein R is the aromatic nucleus of the starting diamine, $H_2NRNH_2$. The linking groups are probably predominantly amido although some may be imido. The polymeric structure may also contain free carboxyl groups which are capable of further reaction. When the enamel is further reacted, for example, in the manufacture of the magnet wire, the above stated reaction products (A) and (B) are to form polymer conforming to the structure of

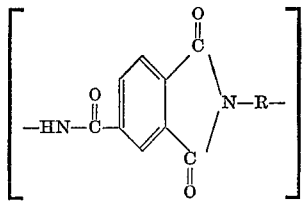

The free carboxyl groups initially present in the polymeric structures are to a substantial extent converted to imide groups by condensation with available amide groups.

The acyl halide derivatives of trimellitic anhydride that are suitable for preparing the aforementioned polyamide-imide polymer have at least one acyl halide group in the 4-ring position. They include, for example, 4-acid chloride, 1,4 and 2,4-diacid chloride (with an ester in the remaining position) and 1,2,4-triacid chloride. The bromides and other reactive halide derivatives are also suitable.

The aromatic diamine that may be used for preparing polyimide enamel preferably have one or more aromatic rings and two primary amino groups. The aromatic diamines having more than one aromatic ring may be polycyclic aromatic compounds having amino groups of an interconnected polycyclic aromatic nucleus.

Specific examples on how the polyamide-imide polymers are prepared are described in greater detail in Netherlands Patent No. 6,400,422.

A number of organic anhydrides may be used to form the solid solution with the amide-imide polymer. Preferably the anhydride is a good solvent for the polymer as well as a good curing agent for the epoxy resin. Suitable organic anhydrides include trimellitic anhydride, phthalic anhydride, maleic anhydride, and dodecyl succinic anhydride. The dodecyl succinic anhydride preferably is used in combination with other anhydrides such as phthalic anhydride for the preparation of the solid solution.

In preparing the solid solution of the amide-imide polymer and the organic anhydride, it is preferred that the anhydride is heated to a sufficient high temperature to provide easy dissolution of the amide-imide polymer. The solution in the form of a melt is then poured into a billet to cool. After cooling, it is crushed and ball milled to a finely divided form. The amount of the anhydride that may be used for preparing the solid solution varies according to the amide-imide polymer and the anhydride used. It also varies depending on the epoxy resin. Generally a 1:1 to 10:1 of polymer to anhydride weight ratio works well. However, this range may vary without appreciably affecting the final physical characteristics of the powder.

The finely divided solid solution is mixed with an epoxy resin. To promote the curing of the anhydride and the epoxies, a conventional catalyst may also be used. Pigments may also be added at this point to impart the desired coloring of the final powder.

The mixing of the solid solution with epoxy resin causes the curing of the epoxies. The curing action of the epoxy resin by the organic anhydride is not certain. The cured epoxy-anhydride structure appears to contain ester-type linkages:

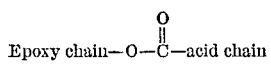

Epoxy chain—O—C—acid chain

The amount of epoxy resin that may be used to react with the solid solution varies according to the amount of the anhydride used. Preferably, the amount is at least stoichiometrically sufficient to react with all the available anhydride.

The reaction mixture with the cured epoxy resin is ground to a fine powder which is suitable for use in the electrostatic coating process. The thus coated wire is heat cured to form a magnet wire that has a smooth coat and high thermoplastic flow.

Further to illustrate this invention, specific examples are described hereinbelow.

Example I.—100 grams of amide-imide polymer prepared by reacting trimellitic anhydride and p,p' methylenebis (aniline) was added slowly into a melt of trimellitic anhydride at 200° to 210° F., until all the amide-imide polymer was in solution. The resultant melt was cast into a billet and was allowed to cool. The solid solution thus formed was crushed and ball-milled to fine particle size.

The fine solid solution particles were mixed with Epi Rez #530 (a solid commercial diglycidyl ether of bisphenol A resin manufactured by Jones-Dabney Co., which has a melting point of 95–105, an epoxy equivalent of 860–1,015 and an average molecular weight of 1,400), Cab—O—Sil (a flow control agent of finely divided $SiO_2$) and $TiO_2$ as a pigment in the following weight ratios:

| | Parts by weight |
|---|---|
| Epi Rez #530 | 60 |
| Amide-imide polymer+TMA | 140 |
| Cab-O-Sil | 4 |
| $TiO_2$ | 8 |

The mixture was ball-milled for 24 hours to provide a very fine powder. The powder was used to coat a rectangular wire using the electrostatic coating process at a coating speed of 22 f.p.m., and a cure cycle of 500° C. for 45 seconds. The sample made by this technique was smooth, take 180° edgewise bend and had a plastic flow over 300° C. The voltage for the coating was 470 volts for a build of 1–2 mils.

Example II.—The same amide-imide polymer was dissolved in phthalic anhydride at the ratio of 25 parts by weight of anhydride to 75 parts by weight of the polymer to form a solid solution according to the first example.

100 parts by weight of finely ground solid solution was mixed with 25 parts by weight of Epi Reb #530 and the mixture was ball-milled for 24 hours. The resultant coating powder was used to coat a rectangular magnet wire using a electrostatic coating process. The magnet wire produced had a smooth film with 250 volts average. It was, however, more brittle than the magnet wire prepared according to the first example.

I claim:

1. A method for preparing a polymeric powder suitable for electrostatic coating of conductors which comprises (a) preparing a solid solution of an amide-imide polymer containing amide and imide linkages in a repeating unit of

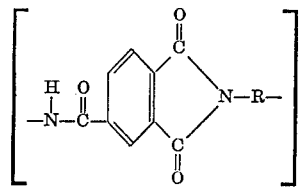

wherein R is a residue of an organic diamine in a dicarboxylic acid anhydride with a weight ratio of polymer to anhydride in the range from about 1:1 to about 10:1 (b) grinding the solid solution to a finely divided form, and (c) mixing said finely divided solid solution with an epoxy resin thereby curing said epoxy with the anhydride to form a coating powder, the amount of epoxy resin used being at least about stoichiometrically sufficient to react with all the available anhydride.

2. A method according to claim 1 wherein the organic anhydride is selected from the group consisting of trimellitic anhydride, phthalic anhydride, maleic anhydride, and dodecyl succinic anhydride.

3. A method according to claim 1 wherein the organic anhydride is trimellitic anhydride.

4. A method according to claim 1 wherein the organic anhydride is phthalic anhydride.

5. A method for preparing a magnet wire which comprises electrostatic coating an electrical conductor with a polymeric powder prepared according to claim 1, and heat curing said powder onto said conductor.

6. A magnet wire comprising an electrical conductor and coated thereon a heat cured polymeric powder prepared according to claim 1.

7. An electrostatic coating powder comprising an amide-imide polymer containing amide and imide linkages in a repeating unit of

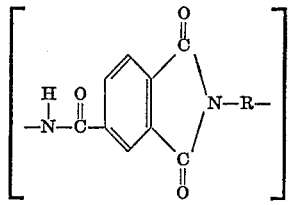

wherein R is a residue of an organic diamine in a dicarboxylic acid anhydride solution, the polymer to anhydride weight ratio being in the range of about 1:1 to about 10:1, and having thereon a coating of an epoxy resin cured by said anhydride, the amount of epoxy resin in the powder being at least equivalent to about the stoichiometric amount being required to react with the available anhydride.

8. An electrostatic coating powder of claim 7 wherein said epoxy resin is cured by trimellitic anhydride.

9. An electrostatic coating powder of claim 8 wherein said epoxy resin is cured by phthalic anhydride.

References Cited

UNITED STATES PATENTS

| 3,182,073 | 5/1965 | Loncrini | 260—78 |
| 3,182,074 | 5/1965 | Loncrini | 260—78 |
| 3,346,665 | 10/1967 | Schwarzer | 260—830 |
| 3,356,691 | 12/1967 | Gaertner | 260—346.3 |
| 3,394,105 | 7/1968 | Christie | 260—830 |

MURRAY TILLMAN, Primary Examiner

PAUL LIEBERMAN, Assistant Examiner

U.S. Cl. X.R.

117—93.4, 100, 132, 232; 260—78, 346.3